United States Patent [19]

McCabe

[11] Patent Number: 4,861,068

[45] Date of Patent: Aug. 29, 1989

[54] SOLENOID VALVE FOR PROGRAMMER VEHICLE SUSPENSION SYSTEM

[75] Inventor: Ralph P. McCabe, Troy, Mich.

[73] Assignee: Colt Industries Inc., New York, N.Y.

[21] Appl. No.: 237,706

[22] Filed: Aug. 29, 1988

[51] Int. Cl.⁴ .............................................. B60G 11/26
[52] U.S. Cl. ..................................... 280/714; 280/707
[58] Field of Search ................................. 280/707, 714

[56] References Cited

U.S. PATENT DOCUMENTS

| | | | |
|---|---|---|---|
| 4,624,478 | 11/1986 | Ohtagaki et al. | 280/714 |
| 4,655,440 | 4/1987 | Eckert | 280/714 |
| 4,702,490 | 10/1987 | Yamaguchi et al. | 280/714 |
| 4,730,816 | 3/1988 | Eckert | 280/714 |

*Primary Examiner*—Kenneth R. Rice
*Attorney, Agent, or Firm*—Walter Potoroka, Sr.

[57] ABSTRACT

A solenoid actuated control valve includes a valve member located in either of a first or a second position within a fluid flow passage in response to the energization or deenergization of a solenoid. In one of its positions, the valve establishes a minimum restriction to flow and in its other position establishes a maximum restriction to flow. The valve member is designed so that the fluid pressures to which it is exposed are essentially balanced in its direction of movement so that the valve may be rapidly shifted with a minimum power requirement. By controlling the solenoid energization by a pulse width modulated control signal, the flow restriction may be time averaged to any restriction intermediate the minimum and maximum restrictions. The valve is especially adapted for use in a vehicle suspension system to provide a variable damping characteristic for a shock absorber, for example, which may be varied in response to vehicle operating conditions monitored by an electronic processor which controls energization of the solenoid.

5 Claims, 1 Drawing Sheet

U.S. Patent   Aug. 29, 1989   4,861,068
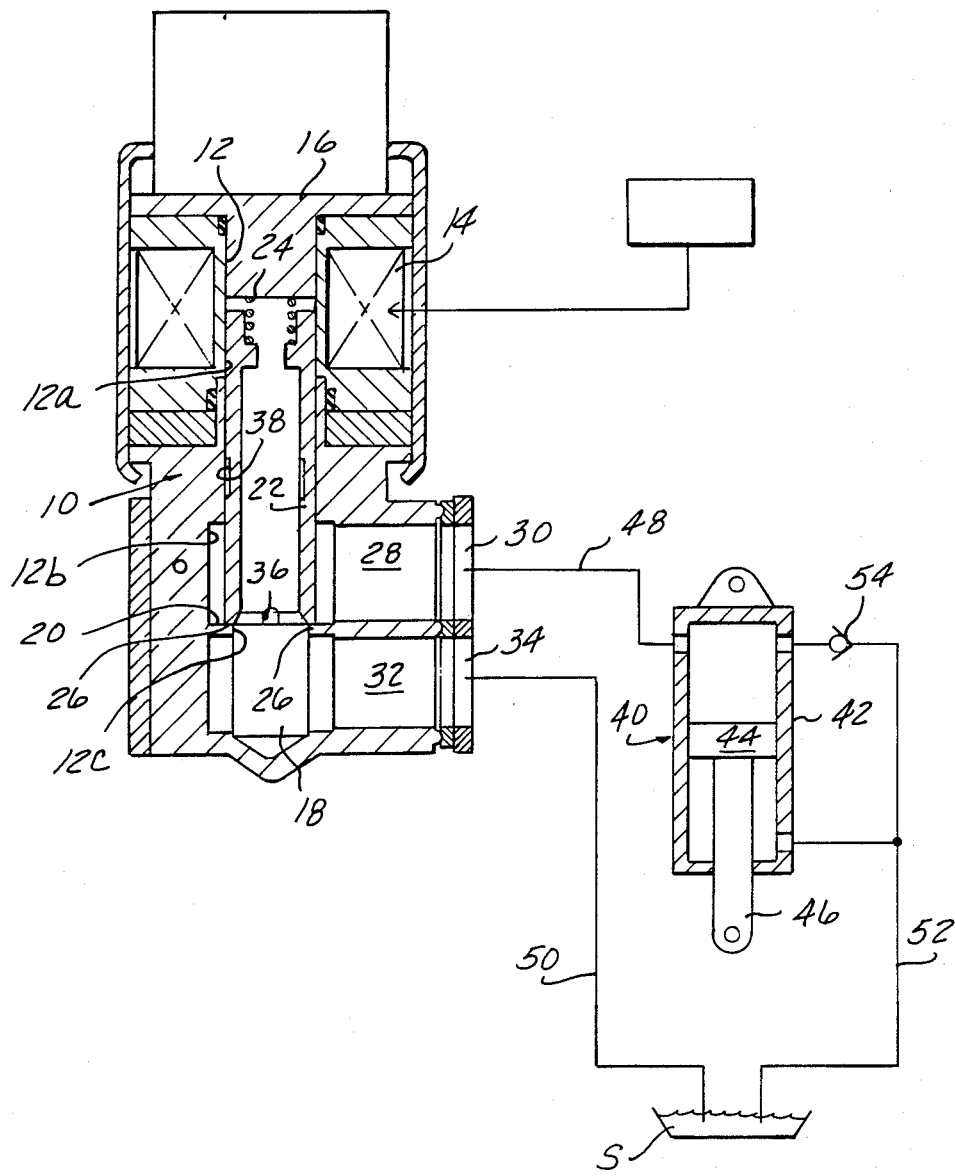

SOLENOID VALVE FOR PROGRAMMER VEHICLE SUSPENSION SYSTEM

BACKGROUND OF THE INVENTION

1. Field of the Invention

In recent years, the automotive industry has been giving considerable attention to improved vehicle suspension systems in which the suspension system may be selectively placed in a "soft" ride mode or a "firm" ride mode. When in the soft ride mode, the suspension system functions primarily as a cushioning device which largely isolates the vehicle body from bouncing movement of the wheels induced by small bumps, etc. in the road surface. Effectively, in the soft ride mode, the suspension system imposes a relatively small resistance to relative movement between the sprung and unsprung components of the suspension. While this particular mode provides a very comfortable ride during normally encountered driving conditions, it will accommodate an undesirably large amount of movement of the vehicle body relative to the wheels during high-speed cornering or emergency braking of the vehicle.

When such suspension systems are in their firm ride mode, the system exerts a much firmer resistance to relative motion between the sprung and unsprung components. The handling characteristics of the vehicle are greatly improved in the firm ride mode; however, bumps in the road surface are not absorbed by the suspension system to any great extent.

2. Description of the Related Art

In the recent past, in addition to enabling the vehicle driver to select either the soft or firm mode, as by a selector switch, such systems have employed an electronic processor to automatically shift all, or parts, of the suspension system to the firm mode in response to variations in certain operational parameters monitored by the processor. For example, if the system had been manually set in its soft mode and an emergency stop was required, the front wheel suspensions would be automatically shifted by the processor to their firm mode in response to the sensing, by the processor, of an increase in hydraulic pressure in the brake lines above a preset pressure. This stiffening of the front end suspension elements minimizes "dive"- i.e., the dropping or lowering of the front end of the vehicle in a panic stop situation.

In such systems, control of the relative stiffness of the suspension is accomplished by controlling the size of an orifice associated with a shock absorber or hydraulic suspension strut to control the rate of flow of fluid displaced by compression of the strut or shock absorber. Typically, a solenoid controlled valve is employed for this purpose, the valve in one position defining a relatively large orifice imposing a minimum restriction to flow (soft ride mode) and presenting, in its other position, a relatively small orifice imposing a substantial restriction to flow through the valve (firm ride mode). The processor was simply programmed to set the valve in one position or the other in accordance with whether a particular parameter monitored by the processor was above or below a preselected value. The controlled strut or shock absorber was thus either in a soft mode or a firm mode and its motion damping characteristic when in one mode differed substantially from its damping characteristic when in the other mode. The selection of the parameter value at which switching between modes took place was, to some extent, an educated guess, and the valve on occasion would shift back and forth between its alternative modes when the monitored parameter hovered about the selected shift point.

The present invention is directed to a solenoid actuated valve which may be operated to continuously vary the orifice size or restriction to flow continuously over the range between the extremes represented by the soft and firm mode settings employed in prior art systems.

Present-day electronic processors are readily capable of generating control signals which accurately and precisely track variables in inputs presented to the processor. However, the conversion of these precise electrical signals into a mechanically variable flow restriction is a problem which has not been adequately solved by the prior art. The present invention utilizes a pulse width modulated control signal generated in a known manner by the processor to cyclically deenergize or energize the solenoid coil of a solenoid actuated valve. While the valve of the present invention has but two positions, it is especially designed to be rapidly shifted between these two positions so that the effective restriction presented by the valve over a period of time is a time averaged restriction which is intermediate between the minimum and maximum restrictions represented by the percentage of time within a given cycle that the valve is at one of its two positions.

SUMMARY OF THE INVENTION

A valve embodying the present invention includes a housing having an internal passage extending along a first axis. A solenoid coil is mounted within the housing in coaxial surrounding relationship with the passage at a location adjacent one end of the passage. The passage includes a first section of a first diameter which extends through and projects beyond one axial end of the coil. This first section of the passage opens into an enlarged diameter passage section. A reduced diameter section of a diameter less than that of the diameter of the first section extends coaxially from the second passage section away from the first section. An elongate, hollow, tubular armature is slidably and sealingly received in the first section of the passage, and one end of the armature projects into the second section to be engageable with a radially inwardly projecting shoulder at the juncture of the second section and a third section of the passage. This end of the armature functions as a valve head and also, when engaged with the shoulder, at least partially blocks fluid communication between the second and third passage sections and establishes a first end limit of movement of the armature to the housing to which the armature is resiliently biased by a spring. When the solenoid coil is energized, the armature is retracted away from the radial shoulder to place the second and third sections of the passage in relatively unrestricted fluid communication with each other.

The second section of the passage is connected to a chamber in a hydraulic suspension strut or shock absorber from which fluid will be displaced upon compression of the strut or shock absorber. The third section of the passage is connected to a fluid sump. The end of the armature which engages the radial shoulder may be formed with one or more notches which define a maximum restriction to fluid flow from the second section of the passage to the third section when the armature is seated on the radial shoulder. When the armature is retracted clear of the shoulder by energization of the solenoid, the valve presents a minimum restriction to flow between the second and third passage sections. The valve is essentially pressure balanced at all times.

Other objects and features of the invention will become apparent by reference to the following specification and to the drawings.

BRIEF DESCRIPTION OF THE DRAWING

FIG. 1 is a detail cross-sectional view of a valve embodying the present invention with a simplified schematic diagram showing an element of a vehicle suspension system connected to the valve.

DESCRIPTION OF THE PREFERRED EMBODIMENT

A valve embodying the present invention includes a valve housing designated generally 10 having a passage 12 extending downwardly through the housing along a first axis to terminate short of the bottom of the housing. A solenoid coil assembly 14 is mounted within the housing adjacent its upper end in surrounding coaxial relationship to the passage 12. A pole piece 16 projects into and seals the upper end of the passage 12.

Passage 12 is formed with a first passage section 12a of a first diameter which extends downwardly through the housing past the bottom of the coil to open at its lower end into an enlarged diameter section 12b of the passage. A third passage section 12c of a diameter less than that of the first passage section 12a extends downwardly from the second passage section 12b to open into an outlet chamber 18. A radially inwardly projecting shoulder 20 is formed in the passage at the juncture of the second and third sections of the passage, sections 12b and 12c respectively.

A hollow tubular armature is received within passage section 12a with a sliding, sealing fit and is normally biased downwardly by a compression spring 24 so that the lower end 26 of armature 22 is seated upon the annular shoulder 20 at the lower end of passage section 12b. The upper end of armature 22 axially overlaps solenoid coil 14 and, upon energization of coil 14, armature 22 is magnetically attracted upwardly into engagement with pole piece 16 to lift the lower end of armature 22 upwardly clear of shoulder 20.

An inlet passage 28 extends through housing 10 from an externally accessible inlet port 30 to open into the second passage section 12b. An outlet passage 32 extends from outlet chamber 18 through housing 10 to an externally accessible outlet port 34.

The lower end 26 of armature 22 functions as a valve head which is normally maintained by spring 24 in seated engagement with the valve seat constituted by shoulder 20. One or more notches 36 may be formed in the lower edge of armature 22 to provide restricted fluid communication between passage sections 12b and 12c when armature 22 is seated on shoulder 20 as shown in FIG. 1. One or more annular grooves, such as 38, may be formed in the exterior surface of armature 22 to loosely entrap dirt particles which may work their way upwardly along the exterior of the armature from passage section 12b.

For purposes of explanation of the operation of the valve, FIG. 1 includes a schematic showing of one manner of connecting the valve into a vehicle suspension system. A schematically illustrated hydraulic shock absorber designated generally 40, including a cylinder 42 and a piston 44 having a rod 46 projecting from one end of the cylinder, is adapted to be connected mechanically between the sprung and unsprung portions of a vehicle suspension system (not shown) in a well-known manner. The head end chamber of cylinder 42 is connected via conduit 48 to inlet port 30 of the valve, while the outlet port 34 is connected via a conduit 50 to a fluid sump. A replenishing conduit 52 connects the sump to both the rod and head end chambers of cylinder 42 to replenish these chambers as required. A one-way check valve 54 is located in that branch of replenishing conduit 52 which leads to the head end chamber to prevent flow of fluid from the head end chamber directly into replenishing conduit 52 while accommodating flow of fluid from conduit 52 into the head end chamber.

Upon compression of shock absorber 40 (upward movement of the piston relative to cylinder 42), fluid under pressure is displaced from the head end chamber of cylinder 42 into conduit 48. If armature 22 is in the seated position shown in FIG. 1, this displaced flow of fluid is required to pass through notch 36, which imposes a substantial restriction upon the rate at which fluid can be displaced from the head end chamber of cylinder 42. This situation would establish a maximum firm ride or maximum damping restriction to shock absorber 40. If, on the other hand, solenoid coil 14 were to be energized, armature 22 would be magnetically attracted upwardly into contact with pole piece 16 to thereby lift the lower end of the armature upwardly clear of shoulder 20 to provide a substantially increased opening accommodating flow of fluid through the valve to establish a maximum soft ride condition or minimium damping restriction to shock absorber 14.

It will be noted that the valve is so designed that the relatively high pressures which may exist in passage section 12b do not exert any axially directed forces upon armature 22 to oppose movement of the armature. The hollow, tubular armature has its opposite axial ends exposed at all times to the pressure existing in outlet chamber 18 which is effectively zero pressure - i.e., the atmospheric pressure acting on sump S. The only pressure differential exerted here occurs when armature 22 is seated, this slight pressure differential arising due to the fact that the pressure in outlet chamber 18 does not act against those portions of the lower edge 26 of the armature which are seated on shoulder 20.

It should be noted that the hollow, tubular construction of the armature minimizes its weight and the fact that the armature is essentially pressure balanced enables the employment of a relatively small solenoid which essentially needs only to overcome the relatively light spring force applied by spring 24. This enables a relatively low-powered solenoid to rapidly actuate and shift armature 22. The structural arrangement of the valve is such that its overall size may be extremely small, one version of the disclosed valve having an overall height of approximately 64 millimeters.

Because of the ability of the valve to rapidly shift between its open and closed positions, the disclosed valve is readily adapted to have the energization of its solenoid coil controlled by a pulse width modulation control system which may operate at frequencies of the order of 60 Hz. Operation in this manner enables the valve to establish a time averaged restriction to flow determined by the percentage of time the valve is in its open position during each cycle of the control system.

While one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. A solenoid actuated control valve operable to establish a variable time averaged restriction to flow of fluid, said valve comprising a housing having a main passage therein extending along a first axis, a solenoid coil mounted in said housing adjacent one end of said main passage in coaxial surrounding relationship to said main passage, a first section of said passage of a first diameter extending from one axial end of said coil to a second section of said passage of a diameter greater than said first diameter, said second section of said passage extending from said first section to a third section of said passage of a diameter less than said first diameter, said passage having a radially inwardly projecting annular shoulder at the juncture of said second and third sections, an elongate hollow tubular aramature slidably and sealingly received in said first section of said passage and having one end projecting into said second section engageable in seated engagement with said shoulder to establish one end limit of movement of said armature axially of said passage and to establish a maximum restriction to flow of fluid from said second section of said passage to said third section, spring means biasing said armature to said one end limit, said solenoid coil being operable when energized to attract said armature to an opposite end limit of movement wherein said one end of said armature is spaced from said shoulder to establish a minimum restriction to flow of fluid from said second section of said passage to said third section, first means in said housing for placing said second section of said main passage in fluid communication with a source of fluid under pressure, and second means in said housing for placing said third section of said passage in fluid communication with a fluid sump.

2. The invention defined in claim 1 further comprising notch means in said one end of said hollow tubular armature for establishing a restricted fluid flow path between said second and third sections of said passage when said one of said armature is in seated engagement with said shoulder.

3. The invention defined in claim 1 further comprising a pole piece closing and the end of said main passage at the opposite axial end of said coil, spring means engaged between said pole piece and the adjacent end of said armature biasing said armature toward said one end limit, and means defining an internal passage extending through said armature from end to end.

4. The invention defined in claim 1 wherein said source of fluid under pressure comprises a component of a vehicle suspension system subject to a variable dynamic loading during operation of the vehicle to induce variations in the fluid pressure of said source, and said suspension system further comprises processor controlled means for cyclically energizing and deenergizing said coil to establish a variable time averaged restriction to flow between said second and third chambers in response to vehicle operating conditions monitored by said processor.

5. In a processor controlled vehicle suspension system for varying the stiffness of the suspension in response to variation of selected inputs to the processor, said system including a solenoid actuated valve operable to establish selected variable restrictions to the flow of fluid induced within said system by dynamic loading of the suspension encountered during operation of the vehicle;

the improvement wherein said processor is operable to cyclically energize and deenergization said solenoid in accordance with a pulse width modulated signal generated by said selected inputs, and said valve comprises a housing having a main passage therein extending along a first axis, a solenoid coil mounted in said housing adjacent one end of said main passage in coaxial surrounding relationship to said main passage, a first section of said passage of a first diameter extending from one axial end of said coil to a second section of said passage of a diameter greater than said first diameter, said second section of said passage extending from said first section to a third section of said passage of a diameter less than said first diameter, said passage having a radially inwardly projecting annular shoulder at the juncture of said second and third sections, an elongate hollow tubular armature slidably and sealingly received in said first section of said passage and having one end projecting into said second section engageable in seated engagement with said shoulder to establish one end limit of movement of said armature axially of said passage and to establish a maximum restriction to flow of fluid from said second section of said passage to said third section, spring means biasing said armature to said one end limit, said solenoid coil being operable when energized to attract said armature to an opposite end limit of movement wherein said one end of said armature is spaced from said shoulder to establish a minimum restriction to flow of fluid from said second section of said passage to said third section, first means in said housing for placing said second section of said main passage in fluid communication with a source of fluid under pressure, and second means in said housing for placing said third section of said passage in fluid communication with a fluid sump.

* * * * *